United States Patent
Fang et al.

(10) Patent No.: US 11,880,994 B2
(45) Date of Patent: Jan. 23, 2024

(54) METHOD AND SYSTEM FOR DETERMINING PLANT LEAF SURFACE ROUGHNESS

(71) Applicant: Zhejiang University, Hangzhou (CN)

(72) Inventors: Hui Fang, Hangzhou (CN); Yong He, Hangzhou (CN); Zeqing Zhang, Hangzhou (CN); Shupei Xiao, Hangzhou (CN)

(73) Assignee: Zhejiang University, Hangzhou (CN)

( * ) Notice: Subject to any disclaimer, the term of this patent is extended or adjusted under 35 U.S.C. 154(b) by 236 days.

(21) Appl. No.: 17/173,834

(22) Filed: Feb. 11, 2021

(65) Prior Publication Data

US 2021/0358160 A1 Nov. 18, 2021

(30) Foreign Application Priority Data

May 18, 2020 (CN) .......................... 202010418409.0

(51) Int. Cl.
 G06T 7/593 (2017.01)
 G06T 5/00 (2006.01)
 (Continued)

(52) U.S. Cl.
 CPC .............. *G06T 7/596* (2017.01); *G06T 5/002* (2013.01); *G06T 7/0002* (2013.01); *G06T 7/33* (2017.01);
 (Continued)

(58) Field of Classification Search
 CPC . G06T 2207/10056; G06T 2207/10061; G06T 2207/30168; G06T 5/002;
 (Continued)

(56) References Cited

U.S. PATENT DOCUMENTS

| | | | |
|---|---|---|---|
| 2003/0035917 A1* | 2/2003 | Hyman | ..................... B41M 5/36 |
| | | | 524/106 |
| 2013/0230214 A1* | 9/2013 | Arth | ......................... G06T 7/74 |
| | | | 382/107 |

(Continued)

FOREIGN PATENT DOCUMENTS

| | | | | | |
|---|---|---|---|---|---|
| CN | 101398898 | * | 4/2009 | ............... | G06K 9/46 |
| CN | 102221347 | * | 10/2011 | ............. | G01B 11/24 |

(Continued)

OTHER PUBLICATIONS

Office Action dated Aug. 25, 2023 for U.S. Appl. No. 17/173,834 (see Notice of Reference Cited), 12 sheets.

*Primary Examiner* — Zhiyu Lu
(74) *Attorney, Agent, or Firm* — Katten Muchin Rosenman LLP

(57) ABSTRACT

Provided is a method and system for determining plant leaf surface roughness. The method includes: acquiring a plurality of continuously captured zoomed-in leaf images by using a zoom microscope image capture system; determining a feature match set according to the zoomed-in leaf images; removing de-noised images of which the number of feature matches in feature match set is less than a second set threshold, to obtain n screened images; combining the n screened images to obtain a combined grayscale image; and determining plant leaf surface roughness according to the combined grayscale image. In the present disclosure, first, a plurality of zoomed-in leaf images are directly acquired by the zoom microscope image capture system quickly and accurately; the zoomed-in leaf images are then screened and combined to form a combined grayscale image; finally, three-dimensional roughness of a plant leaf surface is determined quickly and accurately according to the combined grayscale image.

6 Claims, 4 Drawing Sheets

(51) Int. Cl.
*G06T 7/00* (2017.01)
*G06T 7/90* (2017.01)
*G06T 7/33* (2017.01)

(52) U.S. Cl.
CPC ...... *G06T 7/90* (2017.01); *G06T 2207/10061* (2013.01); *G06T 2207/30168* (2013.01)

(58) Field of Classification Search
CPC ......... G06T 7/0002; G06T 7/33; G06T 7/571; G06T 7/596; G06T 7/90
See application file for complete search history.

(56) References Cited

U.S. PATENT DOCUMENTS

2020/0320682 A1* 10/2020 Alexander ............... G06T 7/90
2021/0289692 A1* 9/2021 Zhang .................... G01D 21/02

FOREIGN PATENT DOCUMENTS

| | | | | |
|---|---|---|---|---|
| CN | 109785372 | * | 5/2019 | ............... G06T 7/33 |
| CN | 110120010 | * | 8/2019 | ............... G06T 7/55 |
| CN | 108254396 | * | 12/2019 | ......... G01N 33/0098 |
| CN | 108323295 | * | 12/2019 | ........... A01C 21/007 |
| CN | 111381579 | * | 7/2020 | ......... G05B 23/0243 |
| CN | 111381579 A | | 7/2020 | |
| GB | 2594909 | * | 11/2021 | ............. A01N 25/30 |
| JP | 2014109493 | * | 6/2014 | ............. G01B 11/02 |

\* cited by examiner

METHOD AND SYSTEM FOR DETERMINING PLANT LEAF SURFACE ROUGHNESS

TECHNICAL FIELD

The present disclosure relates to the technical field of roughness determination, and in particular, to a method and system for determining plant leaf surface roughness.

BACKGROUND

Plant leaf surface roughness directly reflects differences in the microstructure of a leaf surface and can be used to characterize the wettability of plant leaf surfaces. The measurement of plant leaf surface roughness is useful for the study of leaf surface wettability, thereby improving pesticide utilization, reducing agricultural production costs and reducing pesticide pollution to the environment.

Generally, methods for measuring surface roughness can be divided into two categories: contact and non-contact. Probe scanning is a commonly-used contact method. However, the method is low in efficiency and prone to scratch the surface of an object under test, and a test resolution depends on the diameter of a probe tip. It is difficult to apply the method to a plant leaf surface. The non-contact measurement methods are mostly based on statistical analysis of grayscale images in a spatial domain, and usually need support from an optical system, image synthesis, machine vision, confocal microscopy or other technologies to acquire images. The test process is non-destructive to a sample surface, but a measurement range is relatively limited, and the measurement is easily affected by factors such as lighting.

Most of the existing methods are based on electron microscope images of plant leaf surfaces, and the roughness information determined is two-dimensional, which does not visually reflect three-dimensional roughness information of the plant leaf surface. Only a two-dimensional information calculation process has limitations for three-dimensional roughness calculation. In addition, the existing methods for determining plant leaf surface roughness have a low speed and low precision, and require expensive measurement instruments.

SUMMARY

In view of this, the present disclosure aims to provide a method and system for determining plant leaf surface roughness, to quickly and accurately determine three-dimensional roughness of a plant leaf surface.

To achieve the above objective, the present disclosure provides a method for determining plant leaf surface roughness. The method includes step S1: acquiring a plurality of continuously captured zoomed-in leaf images by using a zoom microscope image capture system, step S2: determining a feature match set according to the zoomed-in leaf images, step S3: deleting de-noised images of which the number of feature matches in the feature match set is less than a second set threshold, to obtain n screened images, step S4: combining the n screened images, to obtain a combined grayscale image, and step S5: determining plant leaf surface roughness according to the combined grayscale image.

Optionally, the determining plant leaf surface roughness according to the combined grayscale image specifically includes step S21: performing Gaussian filter de-noising on the zoomed-in leaf images, to obtain a plurality of de-noised images, step S22: determining a feature point corresponding to each pixel point in each de-noised image by using a Speeded Up Robust Features (SURF) algorithm, and step S23: matching the feature points in every two adjacent de-noised images by using a violent matching algorithm, to obtain the feature match set.

Optionally, the matching the feature points in every two adjacent de-noised images by using a violent matching algorithm, to obtain the feature match set specifically includes step S231: matching the feature points in every two adjacent de-noised images by using the violent matching algorithm, step S232: determining a best match distance according to a principle of closest distance, step S233: determining a second best match distance according to the principle of closest distance, and step S234: determining whether a ratio of the best match distance to the second best match distance is greater than or equal to a first set threshold; if the ratio of the best match distance to the second best match distance is greater than or equal to the first set threshold, determining the feature match set, where the feature match set includes feature matches corresponding to a plurality of feature points; if the ratio of the best match distance to the second best match distance is less than the first set threshold, deleting a feature match.

Optionally, the combining the n screened images, to obtain a combined grayscale image specifically includes step S41: generating (n−1) homography matrices according to the n screened images by using a least squares estimation method, step S42: performing perspective transformation on the screened images by using the (n−1) homography matrices, to crop a common region of the screened images, step S43: performing grayscale transformation on the n screened images with the common region, to obtain n original grayscale images, step S44: performing filter transformation on the n original grayscale images, to obtain clarity of each pixel point, step S45: selecting, for each pixel point, an image serial number corresponding to the highest clarity of the pixel point from the n original grayscale images, and mapping the image serial number to be a grayscale value of the pixel point, and step S46: combining all grayscale values corresponding to the highest clarity of the pixel points, to obtain a combined grayscale image reflecting leaf surface depth information.

Optionally, the determining plant leaf surface roughness according to the combined grayscale image specifically includes step S51: removing grayscale values exceeding an extreme value of 1% from the combined grayscale image, and calculating a difference between the grayscale value of each remaining pixel point and a grayscale value of a reference plane, and step S52: calculating the plant leaf surface roughness by using a surface roughness formula.

The present disclosure further provides a system for determining plant leaf surface roughness, including an acquisition module, configured to acquire a plurality of continuously captured zoomed-in leaf images by using a zoom microscope image capture system, a feature match set determining module, configured to determine a feature match set according to the zoomed-in leaf images, a screening module, configured to delete de-noised images of which the number of feature matches in the feature match set is less than a second set threshold, to obtain n screened images, a combined grayscale image determining module, configured to combine the n screened images, to obtain a combined grayscale image, and a plant leaf surface roughness determining module, configured to determine plant leaf surface roughness according to the combined grayscale image.

Optionally, the feature match set determining module specifically includes, a Gaussian filter de-noising unit, configured to perform Gaussian filter de-noising on the zoomed-in leaf images, to obtain a plurality of de-noised images, a feature point determining unit, configured to determine a feature point corresponding to each pixel point in each de-noised image by using a Speeded Up Robust Features (SURF) algorithm, and a feature match set determining unit, configured to match the feature points in every two adjacent de-noised images by using a violent matching algorithm, to obtain the feature match set.

Optionally, the feature match set determining unit specifically includes, a matching sub-unit, configured to match the feature points in every two adjacent de-noised images by using the violent matching algorithm, a best match distance determining sub-unit, configured to determine a best match distance according to a principle of closest distance, a second best match distance determining sub-unit, configured to determine a second best match distance according to the principle of closest distance, and a determining sub-unit, configured to determine whether a ratio of the best match distance to the second best match distance is greater than or equal to a first set threshold; if the ratio of the best match distance to the second best match distance is greater than or equal to the first set threshold, determine the feature match set, where the feature match set includes feature matches corresponding to a plurality of feature points; if the ratio of the best match distance to the second best match distance is less than the first set threshold, delete a feature match.

Optionally, the combined grayscale image determining module specifically includes a homography matrix determining unit, configured to generate (n−1) homography matrices according to the n screened images by using a least squares estimation method, a cropping unit, configured to perform perspective transformation on the screened images by using the (n−1) homography matrices, to crop a common region of the screened images, an original grayscale image determining unit, configured to perform grayscale transformation on the n screened images with the common region, to obtain n original grayscale images, a pixel point clarity determining unit, configured to perform filter transformation on the n original grayscale images, to obtain clarity of each pixel point, a pixel point grayscale value determining unit, configured to select, for each pixel point, an image serial number corresponding to the highest clarity of the pixel point from the n original grayscale images, and map the image serial number to be a grayscale value of the pixel point, and a combined grayscale image determining unit, configured to combine all grayscale values corresponding to the highest clarity of the pixel points, to obtain a combined grayscale image reflecting leaf surface degrees information.

Optionally, the plant leaf surface roughness determining module specifically includes, a difference calculation unit, configured to remove grayscale values exceeding an extreme value of 1% from the combined grayscale image, and calculate a difference between the grayscale value of each remaining pixel point and a grayscale value of a reference plane, and a plant leaf surface roughness determining unit, configured to calculate the plant leaf surface roughness by using a surface roughness formula.

According to embodiments of the present disclosure, the present disclosure has the following technical effects. The present disclosure provides a method and system for determining plant leaf surface roughness. The method includes acquiring a plurality of continuously captured zoomed-in leaf images by using a zoom microscope image capture system, determining a feature match set according to the zoomed-in leaf images, removing de-noised images of which the number of feature matches in feature match set is less than a second set threshold, to obtain n screened images, combining the n screened images to obtain a combined grayscale image, and determining plant leaf surface roughness according to the combined grayscale image. In the present disclosure, first, a plurality of zoomed-in leaf images are directly acquired by the zoom microscope image capture system quickly and accurately, the zoomed-in leaf images are then screened and combined to form a combined grayscale image, finally, three-dimensional roughness of a plant leaf surface is determined quickly and accurately according to the combined grayscale image.

BRIEF DESCRIPTION OF THE DRAWINGS

To describe the technical solutions in embodiments of the present disclosure or in the prior art more clearly, the accompanying drawings needed in the embodiments will be introduced below briefly. Apparently, the accompanying drawings in the following description show merely some embodiments of the present disclosure, and other drawings can be derived from these accompanying drawings by those of ordinary skill in the art without creative efforts.

DETAILED DESCRIPTION

Figure 1:
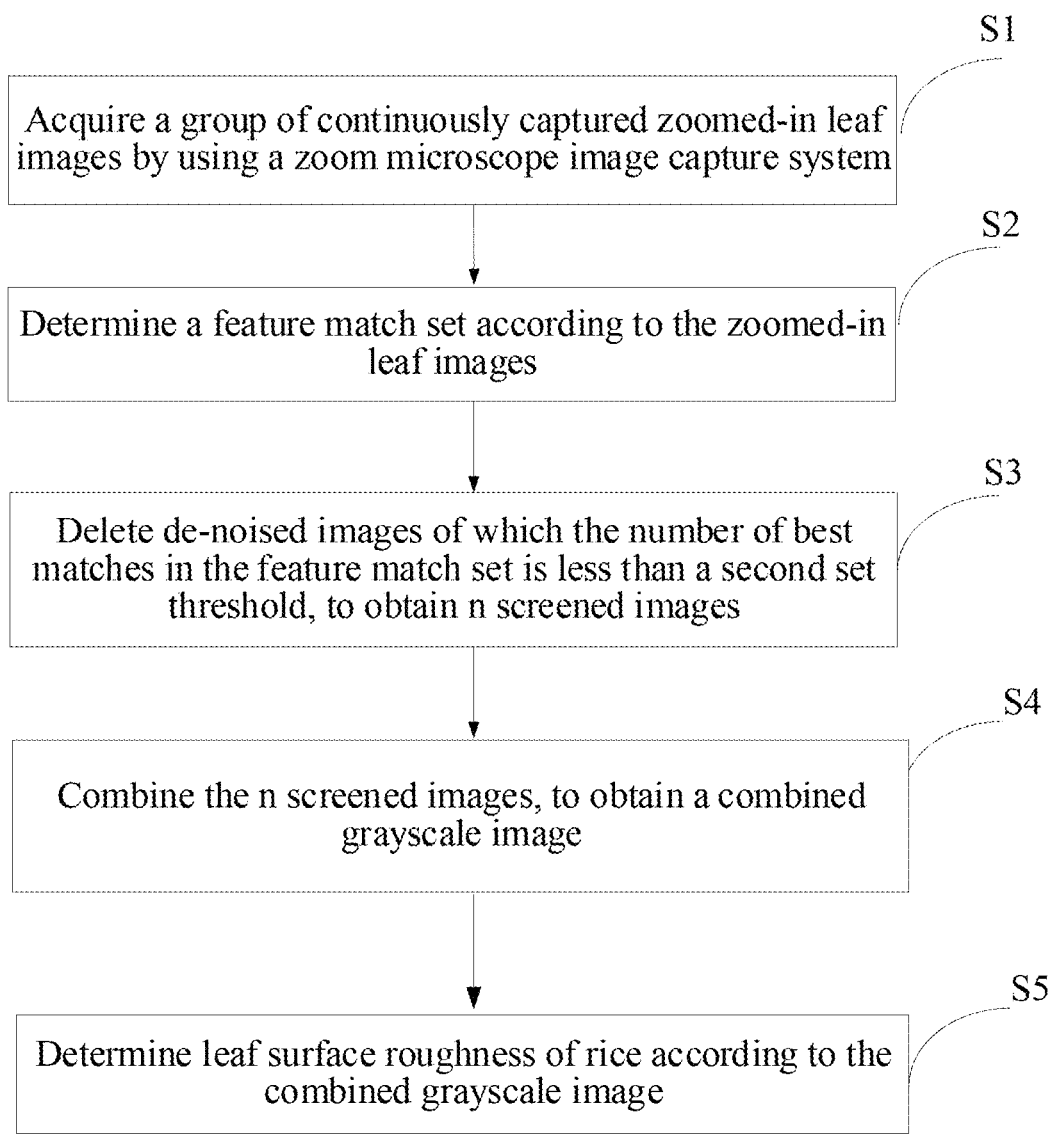
FIG. 1 is a flowchart of a method for determining plant leaf surface roughness according to an example of the present disclosure.

The technical solutions of the embodiments of the present disclosure are clearly and completely described below with reference to the accompanying drawings. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a method and system for determining plant leaf surface roughness, so as to determine three-dimensional roughness of a plant leaf surface quickly and accurately.

To make the objectives, features, and advantages of the present disclosure clearer and comprehensive, the following further describes in detail the present disclosure with reference to the accompanying drawings and specific implementations.

For the roughness measurement of a conventional sample surface, Jahn et al. proposed a method of implementing fractal analysis of surface roughness contours based on the power theorem of a random self-affine function, which involves a smaller computing amount than other conventional fractal dimension analysis methods. For the roughness measurement of a plant leaf surface, Journaux et al. explored the application of pattern recognition and computer vision technologies to extraction of leaf surface roughness features, and images used in the experiments came from scanning electron microscope images of a plant leaf n and a Brodatz texture database. The experiment results showed that Fourier descriptors achieved a good effect of charactering texture features and classifying plant leaf roughness in a dimensionally reduced background, with a minimum classification error of 0.4%. Wang et al. observed scanning electron microscope images of 60 plants and classified the roughness of proximal and distal leaf surfaces into five categories based on the method of Sabo et al. The classification criteria were the fluff distribution on the leaf surface, the waxy structure, and the shape of epidermal cells. Bediaf et al. compared three methods for estimating leaf surface roughness, namely, generalized Fourier descriptors, optical roughness, and wavelet decomposition. The study analyzed leaf-based scanning electron microscope images and introduced different noises to test the sensitivity of each method. As can be learned, obtaining leaf surface roughness information based on electron microscope images or microscope images is still the main means to acquire leaf surface roughness, and fractal dimension is often used to quantify irregular patterns. However, only a calculation process of two-dimensional information is retained, which still has limitations for three-dimensional roughness.

The present disclosure proposes a method for determining plant leaf surface roughness, which achieves rapid acquisition of a plurality of zoomed-in leaf images through a self-built zoom microscope image capture system, and then quickly and accurately determines three-dimensional roughness of a plant leaf surface based on the zoomed-in leaf images.

FIG. 1 is a flowchart of a method for determining plant leaf surface roughness according to the present disclosure. The method includes the following steps:

Step S1: acquire a plurality of continuously captured zoomed-in leaf images by using a zoom microscope image capture system.

Step S2: determine a feature match set according to the zoomed-in leaf images.

Step S3: delete de-noised images of which the number of feature matches in the feature match set is less than a second set threshold, to obtain n screened images.

Step S4: combine the n screened images, to obtain a combined grayscale image.

Step S5: determine plant leaf surface roughness according to the combined grayscale image.

Each step is described in detail below.

Step S1: acquire a plurality of continuously captured zoomed-in leaf images by using a zoom microscope image capture system.

To overcome the problem of expensive measuring instruments in the existing technologies, the zoom microscope image capture system provided in the present disclosure includes an optical experiment platform, an industrial camera, a microscope and a micro-motion platform. The microscope is fastened by a clamping device of the optical experiment platform; the micro-motion platform is fastened on a base of the optical experiment platform by screws; the industrial camera is mounted at the eyepiece of the microscope, and the optical center of the industrial camera is in the same vertical line with the axis of the microscope.

A knob of the micro-motion platform is adjusted to cause the industrial camera to focus on different height positions of the plant leave surface, so that the industrial camera obtains a group of zoomed-in leaf images in which the focus changes slowly and uniformly, and transmits the plurality of captured zoomed-in leaf images to a computer via an Ethernet cable.

Figures 3A, 3B, 3C:
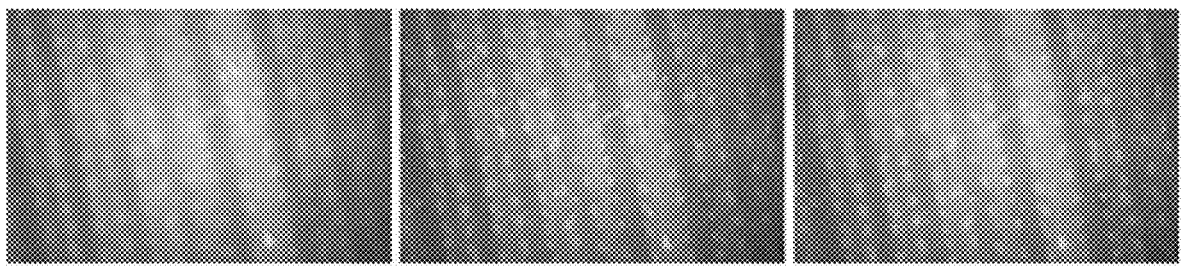
FIGS. 3A-3C show photographs of adaxial surfaces of plant leaves according to an embodiment of the present disclosure.

Step S1 of acquiring a plurality of continuously captured zoomed-in leaf images by using a zoom microscope image capture system specifically includes the following steps:
1) placing a plurality of plant leaves on a carrier platform of the micro-motion platform;
2) adjusting a differential head of the micro-motion platform so that the plurality of plant leaves are in a relatively blurred state where undulating textures can be seen clearly, and taking a first image, as shown in FIG. 3(a); and
3) for half of the plant leaves, adjusting the differential head to drive the carrier platform to move upward at a rotation distance of 1 μm each time, and for the other half of the plant leaves, adjusting the differential head to drive the carrier platform to move upward at a rotation distance of 2 μm each time, so that a distance between the lens of the microscope and the plant leaves is gradually reduced; taking one image for each adjustment, and stopping photographing after the image transits from a completely blurred state as shown in FIG. 3(a) to a partially clear state as shown in FIG. 3(b) and then to a completely blurred state as shown in FIG. 3(c).

With 1 μm as the height resolution, when the carrier platform is adjusted to a certain height, if a set area near a pixel point is in a clear state, the pixel point is considered to be clear; otherwise, the pixel point is considered to be blurred. For a certain image, if all the pixel points are blurred, the image is considered as a completely blurred image; if some of the pixel points are clear and other pixel points are blurred, the image is considered as a partially clear image. In particular, if an original image can be changed from a completely blurred state to a partially clear state after the carrier platform is adjusted once or a few times, the image is considered to be in a relatively blurred state.

Step S2 of determining a feature match set according to the zoomed-in leaf images specifically includes:

Step S21: perform Gaussian filter de-noising on the zoomed-in leaf images, to obtain a plurality of de-noised images, where a specific formula is as follows:

$$g(x, y) = f(x, y) * h(i, j)$$
$$= \sum_i \sum_j f(x-i, y-j) h(i, j)$$

where $h(i,j)$ is a Gaussian kernel, $f(x,y)$ is an original zoomed-in leaf image, $(x,y)$ is a pixel point, and * denotes a convolution operation; an empirical value of the size of the Gaussian kernel is 11×11, and therefore $0 < i \leq 11$, $0 < j \leq 11$.

Step S22: determine a feature point corresponding to each pixel point in each de-noised image by using a Speeded Up Robust Features (SURF) algorithm, which specifically includes the following steps:

Step S221: determine a Hessian matrix corresponding to each pixel point in each de-noised image by using the SURF algorithm, where a specific formula is as follows:

$$H(x, y, \sigma) = \begin{bmatrix} L_{xx}(x, y, \sigma) & L_{xy}(x, y, \sigma) \\ L_{xy}(x, y, \sigma) & L_{yy}(x, y, \sigma) \end{bmatrix};$$

where $L_{xx}(x,y,\sigma)$ denotes a second-order derivative of a de-noised image with a standard deviation $\sigma$ at a pixel point (x,y) along the x-direction; $L_{xy}(x,y,\sigma)$ denotes a second-order derivative of the de-noised image with the standard deviation $\sigma$ at the pixel point (x,y) along the x-direction and y-direction; $L_{yy}(x,y,\sigma)$ denotes a second-order derivative of the de-noised image with the standard deviation $\sigma$ at the pixel point (x,y) along the y-direction; and $H(x,y,\sigma)$ denotes a Hessian matrix corresponding to the standard deviation $\sigma$ and the pixel point (x,y). The local extrema of the determinant of the Hessian matrix is the key to locate the feature point. By constructing Gaussian pyramids and conducting statistics on Harr wavelet features, the calculated SURF feature points are scale invariant and rotation invariant.

Step S222: determine the feature point corresponding to each pixel point according to the Hessian matrix corresponding to each pixel point.

Step S23: match the feature points in every two adjacent de-noised images by using a violent matching algorithm, to obtain the feature match set, which specifically includes the following steps:

Step S231: match the feature points in every two adjacent de-noised images by using the violent matching algorithm.

Step S232: determine a best match distance according to a principle of closest distance, where a specific calculation formula is as follows:

$$Dist(i, 1) = \min_{j \in N_2} \|d_1(i) - d_2(j)\|;$$

where Dist(i,1) denotes the best match distance, $d_1(i)$ denotes the i-th feature point in the first de-noised image, $d_2(j)$ denotes the j-th feature point in the second de-noised image, $N_1$ is the total number of feature points in the first de-noised image, $N_2$ is the total number of feature points in the second de-noised image, and $\|\cdot\|$ is a Euclidean distance of a feature descriptor.

Step S233: determine a second best match distance according to the principle of closest distance, where a specific calculation formula is as follows:

$$Dist(i, 2) = \min_{k \in N_2, k \neq j_*} \|d_1(i) - d_2(k)\|;$$

where Dist(i,2) denotes the second best match distance, $j^*$ is a best match feature point in the second de-noised image, and $d_2(k)$ denotes the k-th feature point in the second de-noised image.

Step S234: determine whether a ratio of the best match distance to the second best match distance is greater than or equal to a first set threshold; if the ratio of the best match distance to the second best match distance is greater than or equal to the first set threshold, determine the feature match set, where the feature match set includes feature matches corresponding to a plurality of feature points; if the ratio of the best match distance to the second best match distance is less than the first set threshold, delete a feature match.

A specific calculation formula for determining the feature match set is as follows:

$$M = \{\{d_1(i), d_2(j^*)\} | i \in N_1, Dist(i,1) \geq rDist(i,2)\};$$

where M denotes the feature match set, and r represents the first set threshold.

Step S3: delete de-noised images of which the number of feature matches in the feature match set is less than a second set threshold, to obtain n screened images.

Step S4 of combining the n screened images to obtain a combined grayscale image specifically includes the following steps:

Step S41: generate (n−1) homography matrices according to the n screened images by using a least squares estimation method.

Step S42: perform perspective transformation on the screened images by using the (n−1) homography matrices, to crop a common region of the screened images.

Step S43: perform grayscale transformation on the n screened images with the common region, to obtain n original grayscale images.

Step S44: perform filter transformation on the n original grayscale images, to obtain clarity of each pixel point, where a specific formula is as follows:

$$D_s(x,y) = |I_s(x,y) * G| * H;$$

where $D_s(x,y)$ denotes the clarity of a pixel point (x,y) in the s-th original grayscale image, $I_s(x,y)$ denotes a grayscale image of the pixel point (x,y) in the s-th original grayscale image, G is a gradient filter, H is an arithmetic mean filter, and * denotes a convolution operation.

The gradient filter adopts two gradient methods. One method is the Tenengrad gradient method, which uses a Sobel operator to calculate gradients in both horizontal and vertical directions. The other method is the Laplacian gradient method, which uses a Laplacian operator.

Step S45: select, for each pixel point, an image serial number corresponding to the highest clarity of the pixel point from the n original grayscale images, and map the image serial number to be a grayscale value of the pixel point.

Step S46: combine all grayscale values corresponding to the highest clarity of the pixel points, to obtain a combined grayscale image reflecting leaf surface depth information, where a specific calculation formula is as follows:

$$S(x, y) = Norm\left(\underset{s}{\mathrm{argmax}} D_s(x, y)\right);$$

where S(x,y) denotes the combined grayscale image reflecting the leaf surface depth information, s denotes an image serial number, and Norm denotes mapping to be a grayscale value.

Step S5 of determining plant leaf surface roughness according to the combined grayscale image specifically includes the following steps:

Step S51: remove grayscale values exceeding an extreme value of 1% from the combined grayscale image, and calculate a difference between the grayscale value of each remaining pixel point and a grayscale value of a reference plane.

Step S52: calculate the plant leaf surface roughness by using a surface roughness formula, where the surface roughness formula is as follows:

$$Ga = \frac{1}{n}\sum_{i=1}^{n}|g_i|;$$

where $g_i$ is the difference between the grayscale value of each remaining pixel point and the grayscale value of the reference plane; Ga is an average value of optical roughness; n is the number of sampling points.

Figure 2:
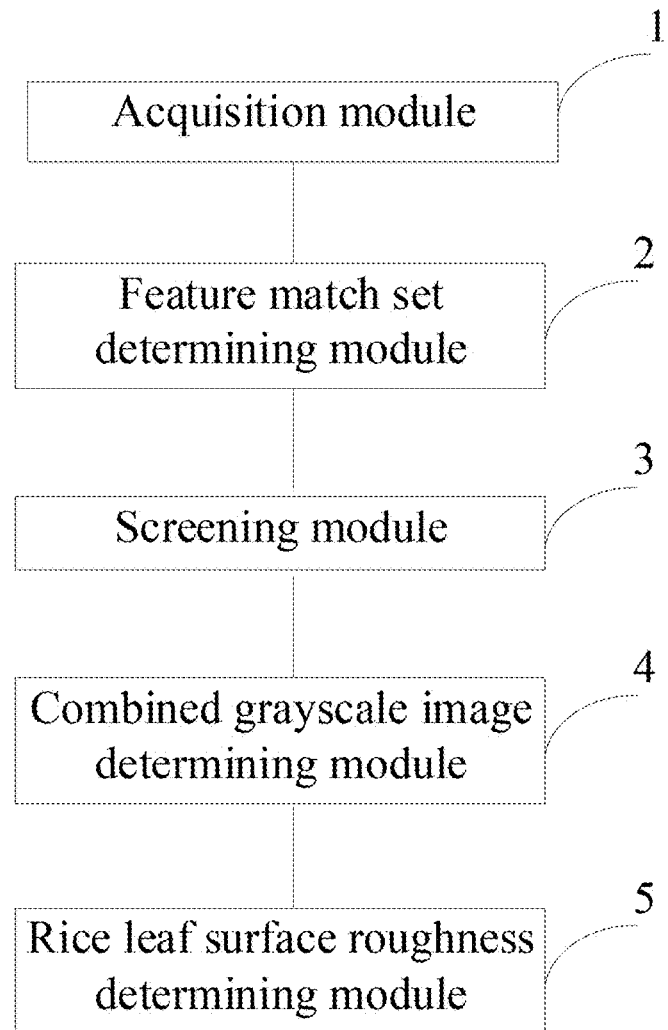
FIG. 2 is a schematic structural diagram of a system for determining plant leaf surface roughness according to an embodiment of the present disclosure.

As shown in FIG. 2, the present disclosure further provides a system for determining plant leaf surface roughness. The system includes:

an acquisition module 1, configured to acquire a plurality of continuously captured zoomed-in leaf images by using a zoom microscope image capture system;

a feature match set determining module 2, configured to determine a feature match set according to the zoomed-in leaf images;

a screening module 3, configured to delete de-noised images of which the number of feature matches in the feature match set is less than a second set threshold, to obtain n screened images;

a combined grayscale image determining module 4, configured to combine the n screened images, to obtain a combined grayscale image; and a plant leaf surface roughness determining module 5, configured to determine plant leaf surface roughness according to the combined grayscale image.

As an implementation, the feature match set determining module 2 of the present disclosure specifically includes:

a Gaussian filter de-noising unit, configured to perform Gaussian filter de-noising on the zoomed-in leaf images, to obtain a plurality of de-noised images;

a feature point determining unit, configured to determine a feature point corresponding to each pixel point in each de-noised image by using an SURF algorithm; and a feature match set determining unit, configured to match the feature points in every two adjacent de-noised images by using a violent matching algorithm, to obtain the feature match set.

As an implementation, the feature match set determining unit of the present disclosure specifically includes:

a matching sub-unit, configured to match the feature points in every two adjacent de-noised images by using the violent matching algorithm;

a best match distance determining sub-unit, configured to determine a best match distance according to a principle of closest distance;

a second best match distance determining sub-unit, configured to determine a second best match distance according to the principle of closest distance; and a determining sub-unit, configured to determine whether a ratio of the best match distance to the second best match distance is greater than or equal to a first set threshold; if the ratio of the best match distance to the second best match distance is greater than or equal to the first set threshold, determine the feature match set, where the feature match set includes feature matches corresponding to a plurality of feature points; if the ratio of the best match distance to the second best match distance is less than the first set threshold, delete a feature match.

As an implementation, the combined grayscale image determining module 4 of the present disclosure specifically includes:

a homography matrix determining unit, configured to generate (n−1) homography matrices according to the n screened images by using a least squares estimation method;

a cropping unit, configured to perform perspective transformation on the screened images by using the (n−1) homography matrices, to crop a common region of the screened images;

an original grayscale image determining unit, configured to perform grayscale transformation on the n screened images with the common region, to obtain n original grayscale images;

a pixel point clarity determining unit, configured to perform filter transformation on the n original grayscale images, to obtain clarity of each pixel point;

a pixel point grayscale value determining unit, configured to select, for each pixel point, an image serial number corresponding to the highest clarity of the pixel point from the n original grayscale images, and map the image serial number to be a grayscale value of the pixel point; and a combined grayscale image determining unit, configured to combine all grayscale values corresponding to the highest clarity of the pixel points, to obtain a combined grayscale image reflecting leaf surface degrees information.

As an implementation, the plant leaf surface roughness determining module 5 of the present disclosure specifically includes:

a difference calculation unit, configured to remove grayscale values exceeding an extreme value of 1% from the combined grayscale image, and calculate a difference between the grayscale value of each remaining pixel point and a grayscale value of a reference plane; and a plant leaf surface roughness determining unit, configured to calculate the plant leaf surface roughness by using a surface roughness formula.

Figure 4A:
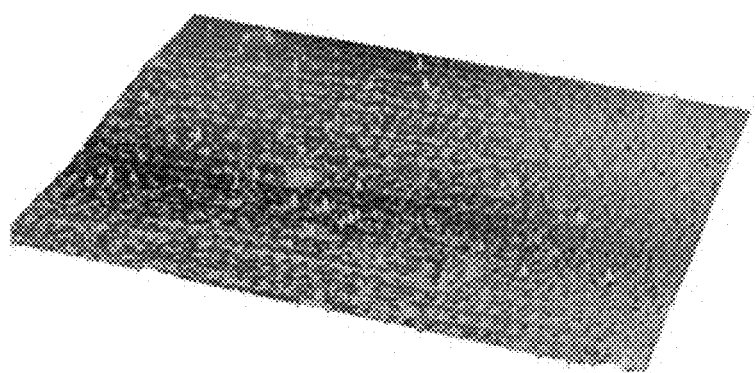
FIGS. 4A-4C show a comparison of photographs taken by three-dimensional interference microscopes and a self-built image platform for the same plant leaf according to an embodiment of the present disclosure.
Figure 4B:
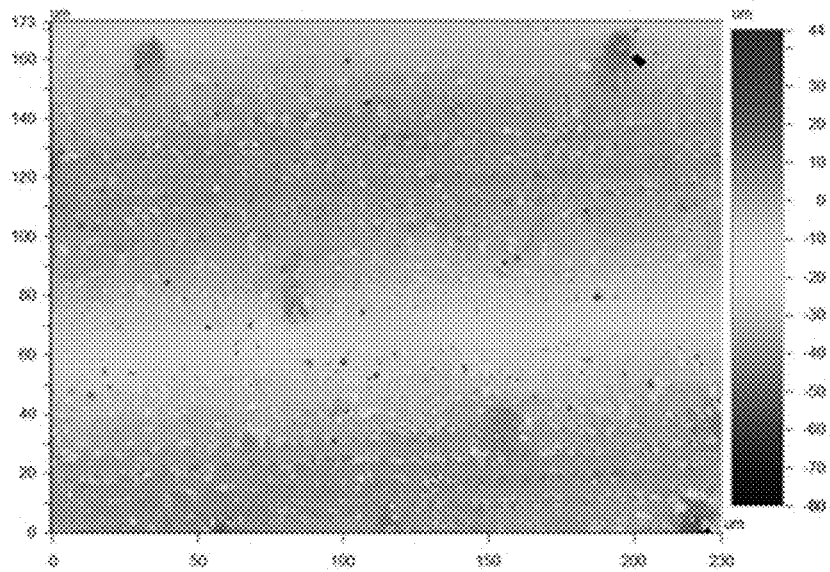
Figure 4C:
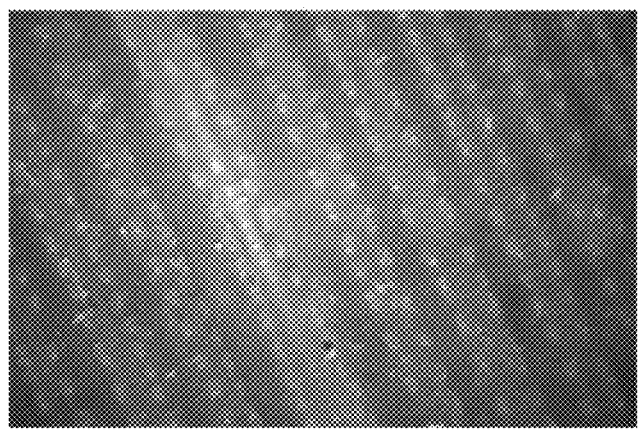

The calculation results of the zoom microscope image capture system used in the present disclosure are roughness of a relatively larger range including main stem veins of rice, while a three-dimensional interference microscope can only capture an extremely small range of plant leaves due to the limitation of the lens range. The comparison of the photographing results of the same leaf is shown in FIG. 4. It can be learned that the three-dimensional interference microscope can capture an image of only two leaf stem veins, while the image capture system in this study can capture an image of about 8 plant leaf stem veins (including the main stem veins).

Figure 5:
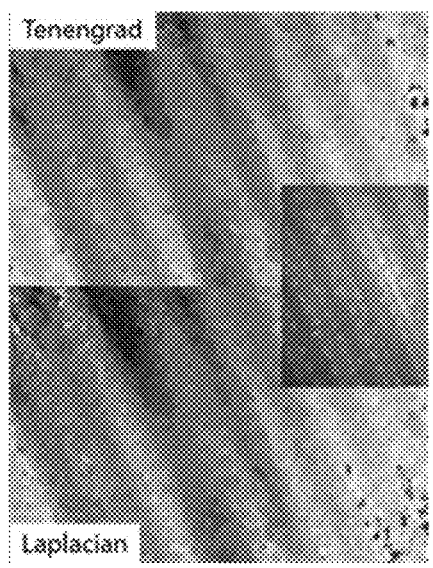
FIG. 5 shows effects of restoring a plant leaf depth map by using two image clarity algorithms according to an embodiment of the present disclosure.

As shown in FIG. 5, the gradient filter of the present disclosure adopts the Tenengrad gradient algorithm and the Laplacian gradient algorithm. The clarity results of the pixel points calculated by using the gradient filter are stable and can clearly reflect the texture changes on the plant leaf surface, and the leaf roughness results obtained by applying the two algorithms on different plant leaf shooting groups are very similar.

Figure 6:
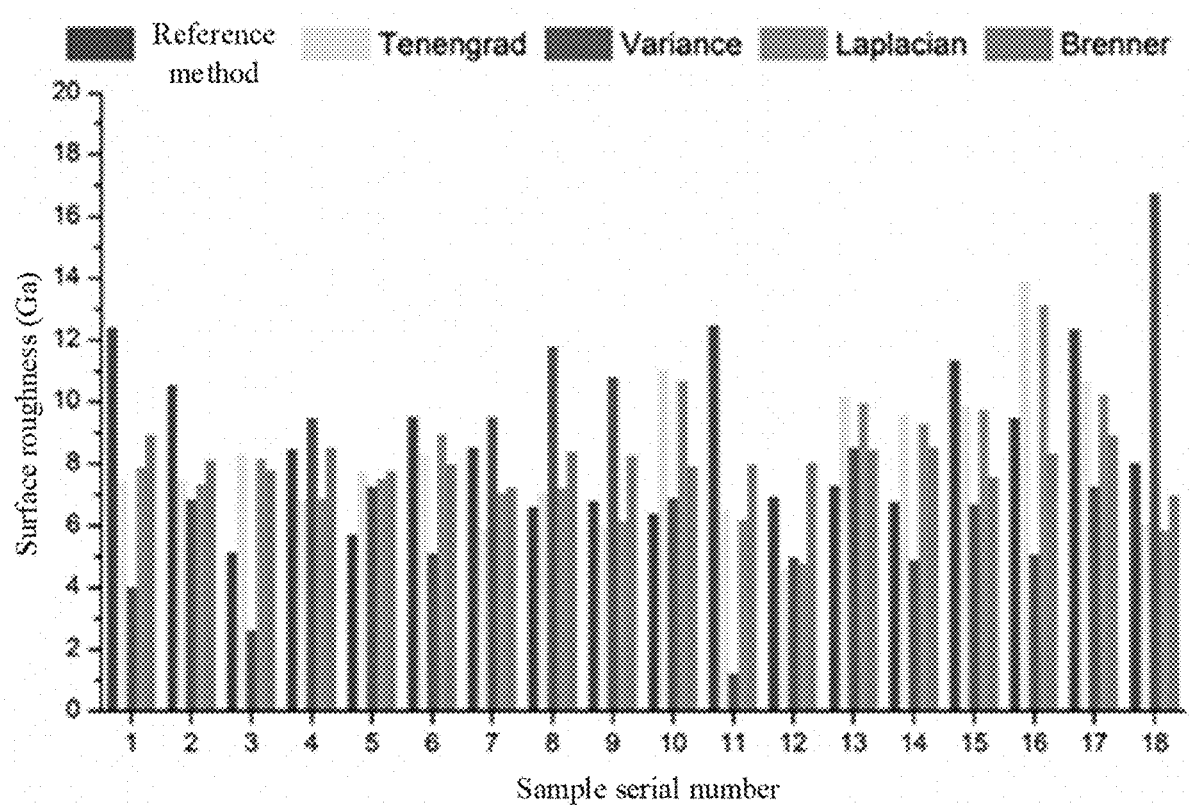
FIG. 6 is a schematic diagram of a comparison of roughness calculation by using four image clarity algorithms according to an embodiment of the present disclosure.

As shown in FIG. 6, a reference value of the third group of samples is significantly lower than the calculation results of the Tenengrad gradient algorithm and the Laplacian gradient algorithm, and this is closely related to the fact that the three-dimensional interference microscope did not capture images of the main stem veins with obvious roughness variations. In addition, depth maps of rice obtained by using the Tenengrad gradient algorithm and the Laplacian gradient algorithm are close to the texture features of the plant leaf surface, and the calculation results of the leaf surface roughness are more reliable. In addition, upon testing by using a standard product, an average relative error of the method is 7.154%, a maximum relative error at a confidence level of 95% is 9.218%, and the measurement result has high accuracy.

Each embodiment of the present specification is described in a progressive manner, each embodiment focuses on the difference from other embodiments, and for the same and similar parts between the embodiments, reference may be made to each other.

In this specification, several specific embodiments are used for illustration of the principles and implementations of the present disclosure. The foregoing description of the embodiments is used to help illustrate the method of the present disclosure and the core ideas thereof. In addition, those of ordinary skill in the art can make various modifications in terms of specific implementations and scope of application in accordance with the ideas of the present disclosure. In conclusion, the content of this specification shall not be construed as a limitation to the present disclosure.

What is claimed is:

1. A method for determining plant leaf surface roughness, comprising:

step S1: acquiring a plurality of continuously captured zoomed-in leaf images by using a zoom microscope image capture system;

step S2: determining a feature match set according to the zoomed-in leaf images via a feature match set determining module of computer-executable instructions stored in a computer device, wherein the determining the feature match set comprises:

step S21: performing Gaussian filter de-noising on the zoomed-in leaf images executed by a Gaussian filter de-noising unit of the computer-executable instructions, to obtain a plurality of de-noised images;

step S22: determining a feature point corresponding to each pixel point in each of the de-noised images by using a Speeded Up Robust Features (SURF) algorithm executed by a feature point determining unit of the computer-executable instructions, the determining the feature point comprising the following steps:

step S221: determining a Hessian matrix corresponding to each pixel point in each of the de-noised images by using the SURF algorithm; and step S222: determining the feature point corresponding to each pixel point according to the Hessian matrix corresponding to each pixel point; and step S23: matching the feature points in every two adjacent de-noised images of the de-noised images, by using a violent matching algorithm executed by a feature match set determining unit of the computer-executable instructions, to obtain the feature match set, wherein the matching the feature points in every two adjacent de-noised images of the de-noised images by using a violent matching algorithm, to obtain the feature match set, comprises:

step S231: matching the feature points in every two adjacent de-noised images of the de-noised images by using the violent matching algorithm executed by a matching sub-unit of the feature match set determining unit;

step S232: determining a best match distance according to a principle of closest distance executed by a best match distance determining sub-unit of the feature match set determining unit;

step S233: determining a second best match distance according to the principle of closest distance executed by a second best match distance determining sub-unit of the feature match set determining unit; and step S234: determining whether a ratio of the best match distance to the second best match distance is greater than or equal to a first set threshold executed by a determining sub-unit of the feature match set determining unit if the ratio of the best match distance to the second best match distance is greater than or equal to the first set threshold, determining the feature match set, wherein the feature match set comprises feature matches corresponding to a plurality of feature points; if the ratio of the best match distance to the second best match distance is less than the first set threshold, deleting a feature match;

step S3: deleting, among the de-noised images, one or more de-noised images of which the number of feature matches in the feature match set is less than a second set threshold executed by a screening module of the computer-executable instructions, to obtain n screened images;

step S4: combining the n screened images via a combined grayscale image determining module of the computer-executable instructions, to obtain a combined grayscale image; and step S5: determining plant leaf surface roughness according to the combined grayscale image via a plant leaf surface roughness determining module of the computer-executable instructions.

2. The method for determining plant leaf surface roughness according to claim 1, wherein the combining the n screened images, to obtain a combined grayscale image specifically comprises:

step S41: generating (n−1) homography matrices according to the n screened images by using a least squares estimation method;

step S42: performing perspective transformation on the screened images by using the (n−1) homography matrices, to crop a common region of the screened images;

step S43: performing grayscale transformation on the n screened images with the common region, to obtain n original grayscale images;

step S44: performing filter transformation on the n original grayscale images, to obtain clarity of each pixel point;

step S45: selecting, for each pixel point, an image serial number corresponding to the highest clarity of the pixel point from the n original grayscale images, and mapping the image serial number to be a grayscale value of the pixel point; and step S46: combining all grayscale values corresponding to the highest clarity of the pixel points, to obtain a combined grayscale image reflecting leaf surface depth information.

3. The method for determining plant leaf surface roughness according to claim 1, wherein the determining plant leaf surface roughness according to the combined grayscale image specifically comprises:

step S51: removing grayscale values exceeding an extreme value of 1% from the combined grayscale image, and calculating a difference between the grayscale value of each remaining pixel point and a grayscale value of a reference plane; and step S52: calculating the plant leaf surface roughness by using a surface roughness formula.

4. A system for determining plant leaf surface roughness wherein the system comprises a computer device that includes a processor and a non-transitory storage medium storing computer-executable instructions for the determining plant leaf surface roughness, the instructions causing the processor to execute steps included in modules and units of the instructions, the instructions comprising:

an acquisition module, configured to acquire a plurality of continuously captured zoomed-in leaf images by using a zoom microscope image capture system;

a feature match set determining module, configured to determine a feature match set according to the zoomed-in leaf images, wherein the feature match set determining module comprises:

a Gaussian filter de-noising unit, configured to perform Gaussian filter de-noising on the zoomed-in leaf images, to obtain a plurality of de-noised images;

a feature point determining unit, configured to determine a feature point corresponding to each pixel point in each of the de-noised images by using a Speeded Up Robust Features (SURF) algorithm, wherein the feature point determining unit is further configured to perform:

determining a Hessian matrix corresponding to each pixel point in each of the de-noised images by using the SURF algorithm; and determining the feature point corresponding to each pixel point according to the Hessian matrix corresponding to each pixel point; and a feature match set determining unit, configured to match the feature points in every two adjacent de-noised images of the de-noised images by using a violent matching algorithm, to obtain the feature match set, wherein the feature match set determining unit comprises:

a matching sub-unit, configured to match the feature points in every two adjacent de-noised images of the de-noised images by using the violent matching algorithm;

a best match distance determining sub-unit, configured to determine a best match distance according to a principle of closest distance;

a second best match distance determining sub-unit, configured to determine a second best match distance according to the principle of closest distance; and a determining sub-unit, configured to determine whether a ratio of the best match distance to the second best match distance is greater than or equal to a first set threshold; if the ratio of the best match distance to the second best match distance is greater than or equal to the first set threshold, determine the feature match set, wherein the feature match set comprises feature matches corresponding to a plurality of feature points; if the ratio of the best match distance to the second best match distance is less than the first set threshold, delete a feature match;

a screening module, configured to delete, among the de-noised images, one or more de-noised images of which the number of feature matches in the feature match set is less than a second set threshold, to obtain n screened images;

a combined grayscale image determining module, configured to combine the n screened images, to obtain a combined grayscale image; and a plant leaf surface roughness determining module, configured to determine plant leaf surface roughness according to the combined grayscale image.

5. The system for determining plant leaf surface roughness according to claim 4, wherein the combined grayscale image determining module specifically comprises:

a homography matrix determining unit, configured to generate (n−1) homography matrices according to the n screened images by using a least squares estimation method;

a cropping unit, configured to perform perspective transformation on the screened images by using the (n−1) homography matrices, to crop a common region of the screened images;

an original grayscale image determining unit, configured to perform grayscale transformation on the n screened images with the common region, to obtain n original grayscale images;

a pixel point clarity determining unit, configured to perform filter transformation on the n original grayscale images, to obtain clarity of each pixel point;

a pixel point grayscale value determining unit, configured to select, for each pixel point, an image serial number corresponding to the highest clarity of the pixel point from the n original grayscale images, and map the image serial number to be a grayscale value of the pixel point; and a combined grayscale image determining unit, configured to combine all grayscale values corresponding to the highest clarity of the pixel points, to obtain a combined grayscale image reflecting leaf surface degrees information.

6. The system for determining plant leaf surface roughness according to claim 4, wherein the plant leaf surface roughness determining module specifically comprises:

a difference calculation unit, configured to remove grayscale values exceeding an extreme value of 1% from the combined grayscale image, and calculate a difference between the grayscale value of each remaining pixel point and a grayscale value of a reference plane; and a plant leaf surface roughness determining unit, configured to calculate the plant leaf surface roughness by using a surface roughness formula.

* * * * *